(12) United States Patent
Chatterjee et al.

(10) Patent No.: US 7,689,766 B1
(45) Date of Patent: Mar. 30, 2010

(54) METHOD, SYSTEM, APPARATUS, AND COMPUTER-READABLE MEDIUM FOR INTEGRATING A CACHING MODULE INTO A STORAGE SYSTEM ARCHITECTURE

(75) Inventors: Paresh Chatterjee, Fremont, CA (US); Anandh Mahalingam, Fremont, CA (US); Ajit Narayanan, Fremont, CA (US); Narayanan Balakrishnan, Milpitas, CA (US)

(73) Assignee: American Megatrends, Inc., Norcross, GA (US)

( * ) Notice: Subject to any disclaimer, the term of this patent is extended or adjusted under 35 U.S.C. 154(b) by 136 days.

(21) Appl. No.: 11/450,518

(22) Filed: Jun. 9, 2006

Related U.S. Application Data (60) Provisional application No. 60/689,587, filed on Jun. 10, 2005, provisional application No. 60/689,486, filed on Jun. 10, 2005.

(51) Int. Cl.
  *G06F 12/00* (2006.01)
  *G06F 13/00* (2006.01)
  *G06F 13/28* (2006.01)
(52) U.S. Cl. .................... 711/113; 711/114; 711/154; 711/156; 714/42; 714/48
(58) Field of Classification Search .............. 711/113, 711/135, 114, 154, 156; 714/42, 48
See application file for complete search history.

(56) References Cited

U.S. PATENT DOCUMENTS

| | | | |
|---|---|---|---|
| 4,942,579 A | 7/1990 | Goodlander et al. | |
| 4,972,316 A | 11/1990 | Dixon et al. | |
| 5,060,144 A | 10/1991 | Sipple et al. | |
| 5,257,367 A | 10/1993 | Goodlander et al. | |
| 5,353,430 A | 10/1994 | Lautzenheiser | |
| 5,579,516 A * | 11/1996 | Van Maren et al. | 707/1 |
| 5,619,690 A * | 4/1997 | Matsumani et al. | 707/200 |

(Continued)

OTHER PUBLICATIONS

"Elementary Data Structures," http//www2.toki.or.id/book/AlgDesignManual/LEC/LECTUR17/NODE7.HTM, Jun. 2, 1997, accessed Feb. 29, 2008.

(Continued)

*Primary Examiner*—Stephen C Elmore
*Assistant Examiner*—Mark A Giardino, Jr.
(74) *Attorney, Agent, or Firm*—Hope Baldauff Hartman, LLC (57) ABSTRACT

A method, system, apparatus, and computer-readable medium are provided for integrating a caching module into a data storage system architecture. According to one method, a request to perform an I/O operation is received at the caching module from an initiator. In response to the request, the caching module provides a notification to a storage driver that the request will be delivered to the storage driver in the future. In response to receiving the notification, the storage driver determines whether the request can be satisfied. If the storage driver determines that it will be unable to satisfy the forthcoming I/O request, the storage driver may provide an error message to the caching module. If the storage driver determines that it will be able to satisfy the I/O request, the storage driver can optimize the allocation and placement of the I/O request prior to receiving the actual I/O request. When the caching module subsequently sends the actual I/O request to the storage driver, the storage driver utilizes the previously allocated space and optimized placement to perform the requested I/O operation.

13 Claims, 5 Drawing Sheets

U.S. PATENT DOCUMENTS

| | | |
|---|---|---|
| 5,720,027 A | 2/1998 | Sarkozy et al. |
| 5,732,238 A | 3/1998 | Sarkozy |
| 5,761,709 A * | 6/1998 | Kranich .................. 711/122 |
| 5,778,430 A | 7/1998 | Ish et al. |
| 5,790,774 A | 8/1998 | Sarkozy |
| 5,809,560 A | 9/1998 | Schneider |
| 5,884,093 A * | 3/1999 | Berenguel et al. ............ 710/1 |
| 5,893,919 A | 4/1999 | Sarkozy et al. |
| 6,038,570 A | 3/2000 | Hitz et al. |
| 6,098,128 A | 8/2000 | Velez-McCaskey et al. |
| 6,205,450 B1 | 3/2001 | Kanome |
| 6,216,207 B1 | 4/2001 | Miller et al. |
| 6,389,513 B1 | 5/2002 | Closson |
| 6,591,334 B1 * | 7/2003 | Shyam et al. ............. 711/112 |
| 7,249,218 B2 * | 7/2007 | Gibble et al. ............. 711/113 |
| 2005/0177684 A1 | 8/2005 | Hoshino et al. |

OTHER PUBLICATIONS

U.S. Appl. No. 11/450,594, filed Jun. 9, 2006, entitled "Method, System, Apparatus, and Computer-Readable Medium for Implementing Caching in a Storage System," Inventors: Chatterjee et al.

U.S. Official Action dated Mar. 4, 2008, in U.S. Appl. No. 11/450,594.

U.S. Official Action dated Sep. 30, 2008 in U.S. Appl. No. 11/450,594.

U.S. Official Action dated Mar. 16, 2009 in U.S. Appl. No. 11/450,594.

U.S. Appl. No. 12/498,599, filed Jul. 7, 2009, entitled "Method, System, Apparatus, and Computer-Readable Medium for Implementing Caching in a Storage System," Inventors: Chatterjee et al.

U.S. Official Action dated Aug. 27, 2009 in U.S. Appl. No. 11/450,594.

* cited by examiner

METHOD, SYSTEM, APPARATUS, AND COMPUTER-READABLE MEDIUM FOR INTEGRATING A CACHING MODULE INTO A STORAGE SYSTEM ARCHITECTURE

CROSS-REFERENCE TO RELATED APPLICATIONS

This application claims the benefit of U.S. provisional patent application No. 60/689,587, filed on Jun. 10, 2005, and U.S. provisional patent application No. 60/689,486, also filed on Jun. 10, 2005, both of which are expressly incorporated herein by reference in their entirety.

TECHNICAL FIELD

The present invention is related to the field of computer data storage systems. More particularly, the present invention is related to the field of caching in data storage systems.

BACKGROUND OF THE INVENTION

Write-back disk caches are commonly found in data storage systems. These caches are used to improve disk bandwidth utilization in the case of write operations and to reduce the number of disk input/output ("I/O") operations in the case of read operations. Write-back caches generally operate by storing data that is to be written to disk in random access memory ("RAM") until an appropriate time when the data can be flushed from the cache to the disk in batches. The contents of the cache are also utilized to satisfy read requests, when possible, thereby avoiding a costly read from the disk.

While write-back caching has several attractions, there are issues that arise because the disk driver layer below the cache is only called when the cache is flushed. In particular, disk errors may go unnoticed until a flush, even though the operation appears to have completed successfully to the initiator. This problem is often manifested as a "delayed write failure" in some operating systems. In thin provisioned systems, which can allocate an amount of storage greater than the actual physical capacity of the system, write-back caches may store a large amount of data without knowledge that the underlying disks do not have the space to accommodate the data. Only when the cache is flushed does the out of space error occur. At that point in time it is typically too late for the initiator to account for the problem.

One other problem that is often encountered in storage systems is that of file system and operating system metadata I/O operations reducing the sequentiality of data I/O operations. Typical write-back caches do nothing to mitigate this problem, thereby reducing the overall performance of the storage subsystem.

It is with respect to these considerations and others that the present invention has been made.

SUMMARY OF THE INVENTION

In accordance with the present invention, the above and other problems are solved by a method, system, apparatus, and computer-readable medium for integrating a caching module with a data storage system. Through the embodiments of the invention, a caching module can notify a storage driver when a request to perform an I/O operation is received, but prior to passing the actual I/O request to the storage driver. With the notification regarding the forthcoming I/O operation, the storage driver can determine whether storage space will be available for the I/O operation, allocate the space ahead of time if available, and perform other optimizations. If space will not be available for the I/O operation, the caching module and the initiator can be notified so that remedial action may be taken.

According to one aspect of the invention, a method is provided for integrating a caching module into a storage system architecture. According to the method, a request is received at the caching module from an initiator for performing an I/O operation. In response to the request, the caching module is operative to provide a notification to a storage driver that the request will be delivered to the storage driver in the future. In response to receiving such a notification, the storage driver can determine whether the request can be satisfied, when received. For instance, the storage driver can determine whether sufficient storage space will exist to satisfy the I/O request in a thin-provisioned system.

If the storage driver determines that it will be unable to satisfy the forthcoming I/O request, the storage driver may provide an error message to the caching module. The caching module, in turn, may relay the message to the initiator that made the I/O request. In this manner, the initiator may take remedial action to prevent against data loss as a result of the storage driver's inability to satisfy the I/O request.

If the storage driver determines that it will be able to satisfy the I/O request, the storage driver may take additional steps to optimize the allocation and placement of the I/O request prior to receiving the actual I/O request. For instance, in a thin-provisioned system, the storage driver may allocate storage space for the future I/O request ahead of time. In this manner, the space for the I/O request has already been allocated when the actual I/O request arrives. The storage driver may also take steps to optimize the placement of the data for the I/O. For instance, the storage driver may allocate space for the I/O request in a manner to ensure that the I/O does not span two redundant array of inexpensive disk ("RAID") stripes. The storage driver may also sequentialize the metadata and data making up the I/O.

According to other aspects of the method, the caching module is operative to subsequently send the actual I/O request to the storage driver when the cache is flushed. When the actual I/O request is received at the storage driver, the storage driver utilizes the previously allocated space and optimized placement to perform the I/O request faster.

According to other aspects of the invention, a system is provided for integrating a caching module into a data storage system. According to one embodiment, the system includes a caching module operative to receive I/O requests from one or more initiators, and to provide a notification to a storage driver that an I/O request has been received prior to delivering the actual I/O request to the storage driver. The system also includes a storage driver that is operative to receive the notification from the caching module, to determine whether the I/O request can be completed, and to notify the caching module if it will be unable to complete the I/O request. If the caching module receives a notification from the storage driver that the I/O request cannot be completed, it can notify the initiator that the request cannot be completed so that the initiator can take action to ensure that data will not be lost.

According to other aspects of the system, the storage driver is operative to allocate storage space for the I/O request if it determines that sufficient space will be available to satisfy the request. Additionally, the storage driver is operative to optimize the placement of data for the I/O request, including allocating space in a manner that ensures that the I/O request will not span two RAID stripes, and by sequentializing the metadata and data that comprises the I/O request. When the caching module subsequently provides the actual I/O request to the storage driver, the storage driver is operative to use the previously allocated space and optimized placement to satisfy the I/O request with high performance.

The above-described aspects of the invention may also be implemented as a computer-controlled apparatus, a computer process, a computing system, an apparatus, a data structure, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Embodiments of the present invention provide a method, system, apparatus, data structure, and computer-readable medium for integrating a cache module into a storage system architecture. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
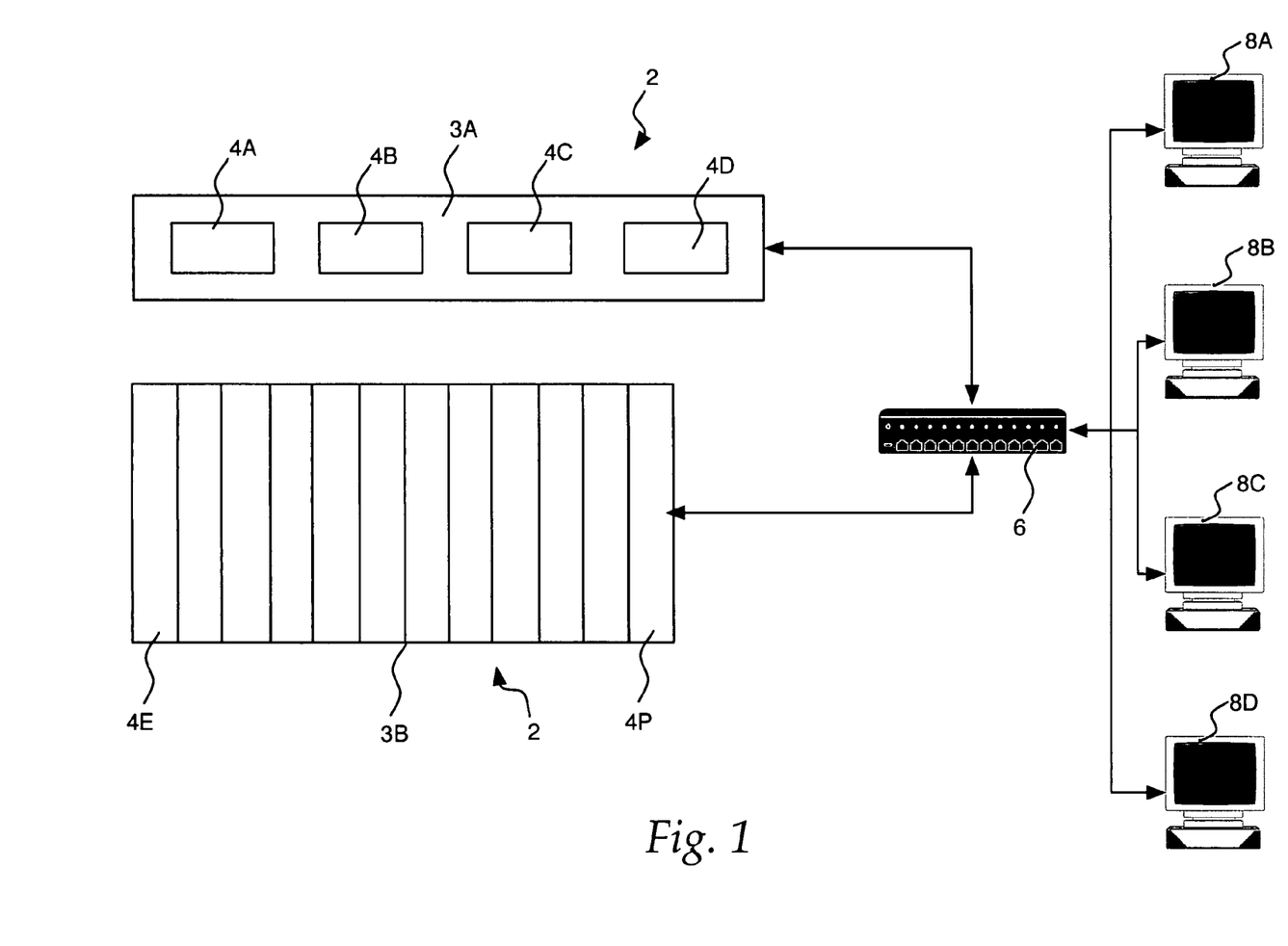
FIG. 1 is a computer architecture diagram showing aspects of a computer network utilized as an illustrative operating environment for the various embodiments of the invention.
Figure 2:
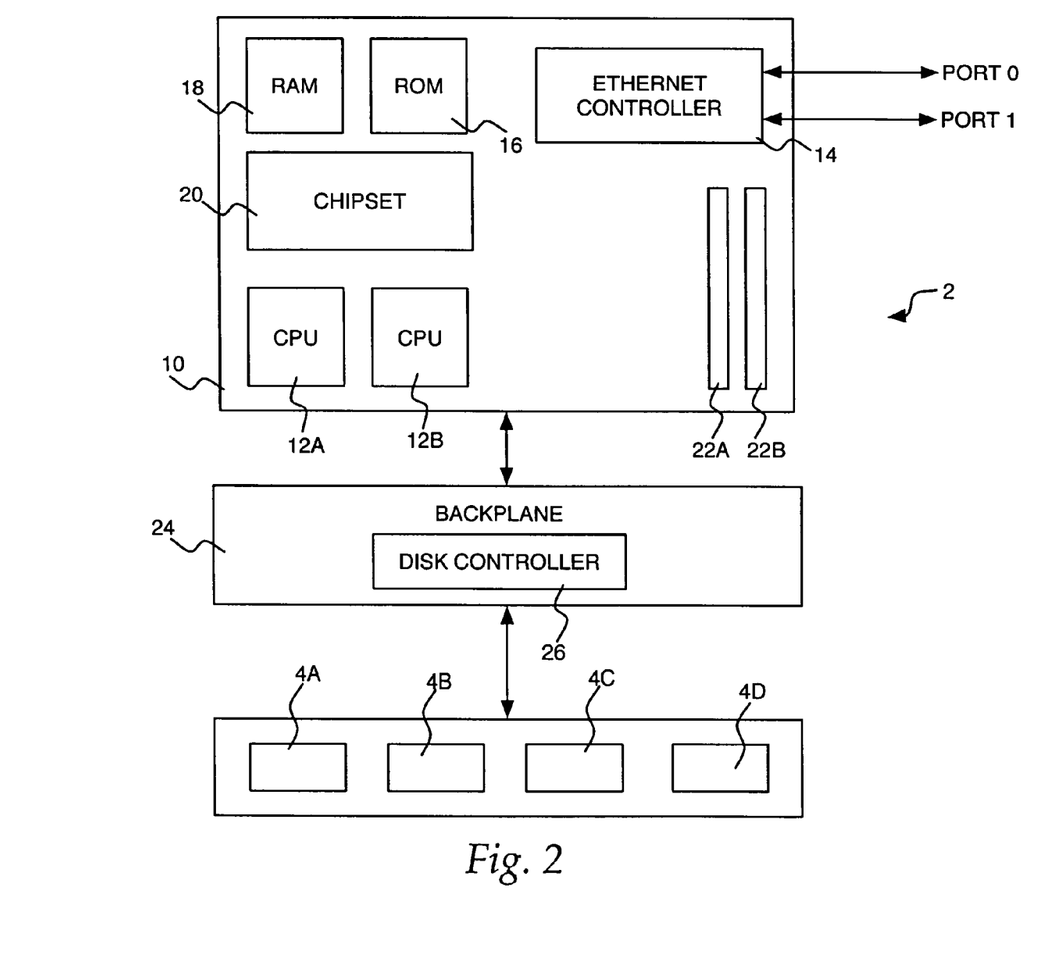
FIG. 2 is a computer architecture and network diagram illustrating aspects of a storage server computer provided by the various embodiments of the invention.
Figure 3:
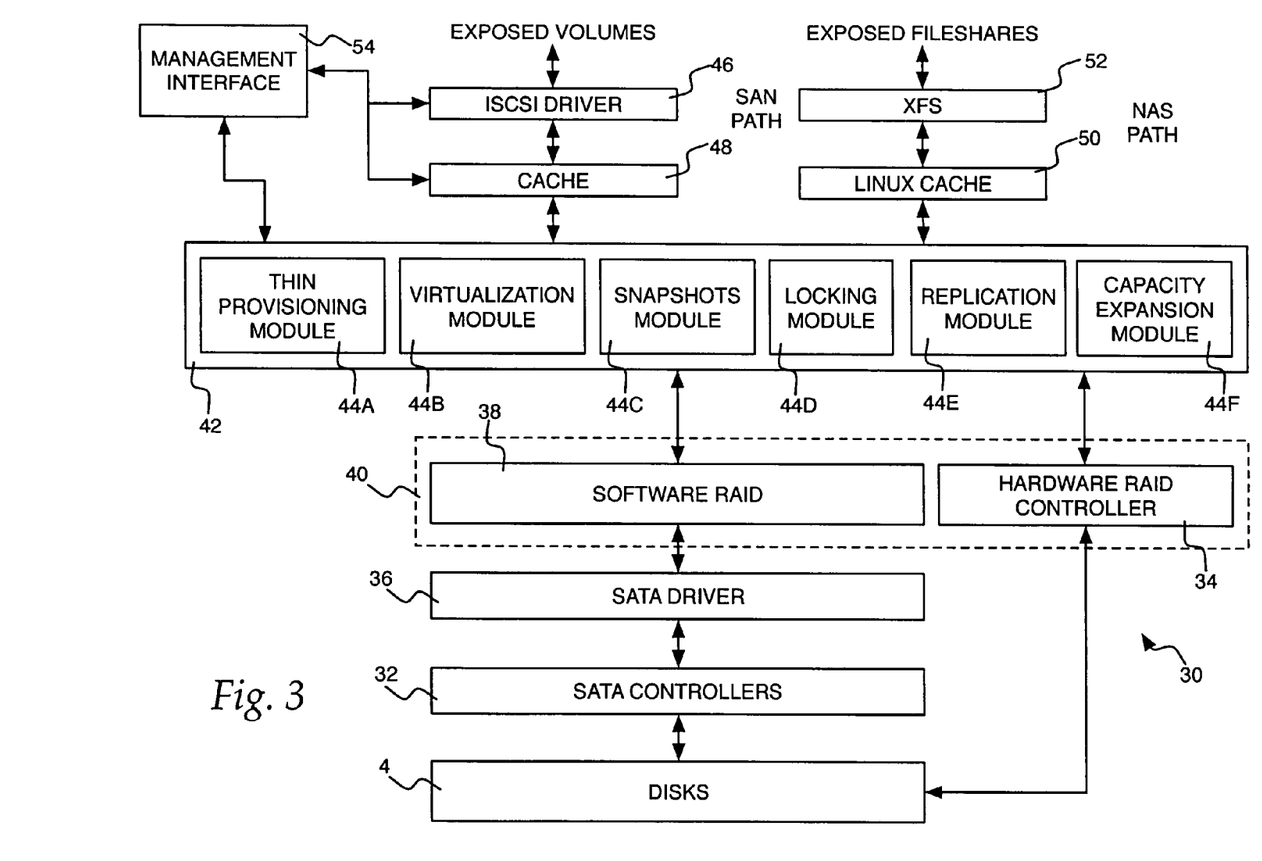
FIG. 3 is a software architecture diagram illustrating various aspects of a storage stack utilized by a storage server provided in embodiments of the invention.

FIGS. 1-3 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. While the invention will be described in the general context of program modules that execute in conjunction with an operating system on a computer system, those skilled in the art will recognize that the invention may also be implemented in combination with other program modules.

Referring now to FIG. 1, an illustrative operating environment for the various embodiments of the present invention will be described. As shown in FIG. 1, the embodiments of the invention described herein may be implemented in a storage server computer 2 that is operative to receive and respond to requests to read and write data to a mass storage device, such as a hard disk drive. According to embodiments of the invention, the storage server computer 2 may be housed in a one rack space unit 3A storing up to four hard disk drives 4A-4D. Alternatively, the storage server computer may be housed in a three rack space unit 3B storing up to fifteen hard disk drives 4E-4P. Other types of enclosures may also be utilized that store fewer or more hard disk drives. In this regard, it should be appreciated that the type of storage enclosure and number of hard disk drives utilized is not generally significant to the implementation of the embodiments of the invention. Any type of storage enclosure and virtually any number of hard disk devices or other types of mass storage devices may be utilized without departing from the spirit and scope of the invention.

According to embodiments, the storage server computer 2 includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which the storage server computer 2 is a part.

The network switch 6 is connected to one or more client computers 8A-8D (also referred to herein as "initiators"). It should be appreciated that other types of networking topologies may be utilized to interconnect the clients and the storage server. It should also be appreciated that the initiators 8A-8D may be connected to the same local area network ("LAN") as the storage server computer 2 or may be connected to the storage server computer 2 via a distributed wide area network, such as the Internet. An appropriate protocol, such as the Internet Small Computer Systems Interface ("iSCSI") protocol may be utilized to enable the initiators 8A-8D to communicate with and utilize the various functions of the storage server computer 2 over a wide area network such as the Internet. It should also be appreciated that the term "initiators" as utilized herein includes any computer system, application program, or program module capable of initiating a request to perform an I/O operation.

According to the various aspects of the invention, the storage server computer 2 is operative to receive and respond to requests from the initiators 8A-8D to read or write data on the hard disk drives 4A-4P. As described in greater detail herein, the storage server computer 2 is operative to provide advanced features for data storage and retrieval to its clients. In particular, the storage server computer may provide redundant array of inexpensive disks ("RAID") functionality for the hard disk drives 4A-4P. The storage server computer 2 may also allow the hard disk drives 4A-4P to be partitioned into logical volumes for access by the initiators 8A-8D. Additional advanced features described herein, such as thin provisioning, snapshots, and disk caching may also be provided by the storage server computer 2.

Turning now to FIG. 2, an illustrative computer hardware architecture for practicing the various embodiments of the invention will now be described. In particular, FIG. 2 shows an illustrative computer architecture and implementation for the storage server computer 2. In particular, the storage server computer 2 includes a baseboard 10, or "motherboard", which is a printed circuit board to which a multitude of components or devices may be connected by way of a system bus or other electrical communication path. In one illustrative embodiment, these components include, without limitation, one or more central processing units ("CPU") 12A-12B, a network adapter, such as the Ethernet controller 14, a system memory, including a Read Only Memory 16 ("ROM") and a Random Access Memory 18 ("RAM"), and other hardware for performing input and output, such as a video display adapter or a universal serial bus port ("USB"), not all of which are illustrated in FIG. 2.

The motherboard 10 may also utilize a system board chipset 20 implementing one or more of the devices described herein. One or more hardware slots 22A-22B may also be provided for expandability, including the addition of a hardware RAID controller to the storage server computer 2. It should also be appreciate that, although not illustrated in FIG. 2, a RAID controller may also be embedded on the motherboard 10 or implemented in software by the storage server computer 2. It is also contemplated that the storage server computer 2 may include other components that are not explicitly shown in FIG. 2 or may include fewer components than illustrated in FIG. 2.

As described briefly above, the motherboard 10 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 18 and a ROM 16. The ROM 16 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 14 may be capable of connecting the local storage server computer 2 to the initiators 8A-8D via a network. Connections which may be made by the network adapter may include local area network LAN or WAN connections. LAN and WAN networking environments are commonplace in offices, enterprise-wide computer networks, intranets, and the Internet. The CPUs 12A-12B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 10 is connected via a backplane 24 and disk controller 26 to one or more mass storage devices. The mass storage devices may comprise hard disk drives 4A-4D or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments of the invention will now be described. In particular, FIG. 3 illustrates a storage stack 30 utilized in the embodiments of the invention. At the top of the storage stack 30, storage volumes or fileshares are exposed to the initiators 8A-8D. At the bottom of the storage stack 30 are the actual mass storage devices, such as the disks 4, that are utilized to store the data. The mass storage devices are, in turn, connected to a disk controller, such as a Serial ATA ("SATA") controller 32 or a hardware RAID controller 34. In the case of a SATA controller, a SATA driver 36 may be utilized to access the hardware device. Additionally, a software RAID module 38 may also be utilized to provide RAID services in the absence of a hardware RAID controller 34. A unified RAID management layer 40 may be utilized to simplify the utilization of RAID with either software or hardware implementations.

Above the unified RAID management layer 40 sits a kernel module 42 that implements some of the functions described herein. In particular, the kernel module 42 may provide functionality for implementing thin provisioning, virtualization, snapshots, locking, replication, and capacity expansion. These features are implemented by the modules 44A-44F, respectively, and are described in greater detail herein. In particular, the thin provisioning module 44A provides functionality for allocating physical capacity to logical volumes on an as-needed basis. The virtualization module 44B provides functionality for creating virtual tape libraries. The snapshots module 44C provides functionality for creating, utilizing, and managing point in time snapshots of the contents of logical storage volumes. The replication module 44E provides functionality for replication within the computer 2.

The capacity expansion module 44F provides functionality for adding storage capacity to the computer 2.

Above the kernel module 42, a number of software components are utilized depending upon the access mechanism utilized to access the data stored on the hard disk drives 4. In particular, a Storage Area Network ("SAN") path is provided that utilizes a caching module 48 and a Internet Small Computer Systems Interface ("iSCSI") driver 46. A Network Attached Storage ("NAS") path is also provided that utilizes a LINUX cache 50 and the XFS high-performance journaling file system 52. Volumes are exposed through the SAN path while fileshares are exposed through the NAS path. Additional details regarding the operation of the caching module 48 will be provided below with respect to FIGS. 4-5. It should be appreciated that the invention may also be implemented in the LINUX cache 50 or in other types of software or hardware cache devices.

It should also be appreciated that the kernel module 42 comprises a LINUX-compatible mass storage device driver in the embodiments of the invention described herein. However, although the embodiments of the invention are described as being implemented within a LINUX-compatible device driver, the various aspects of the invention may be implemented at different points within the storage stack and in conjunction with other operating systems. For instance, the aspects of the invention may be implemented with the FREEBSD operating system or with the WINDOWS family of operating systems from MICROSOFT CORPORATION of Redmond, Wash.

According to embodiments of the invention, a management interface 54 may also be provided for controlling and monitoring the various aspects of the present invention. The management interface communicates with the various layers through software interfaces to retrieve performance data, provide configuration data, and to perform other functions.

Figure 4:
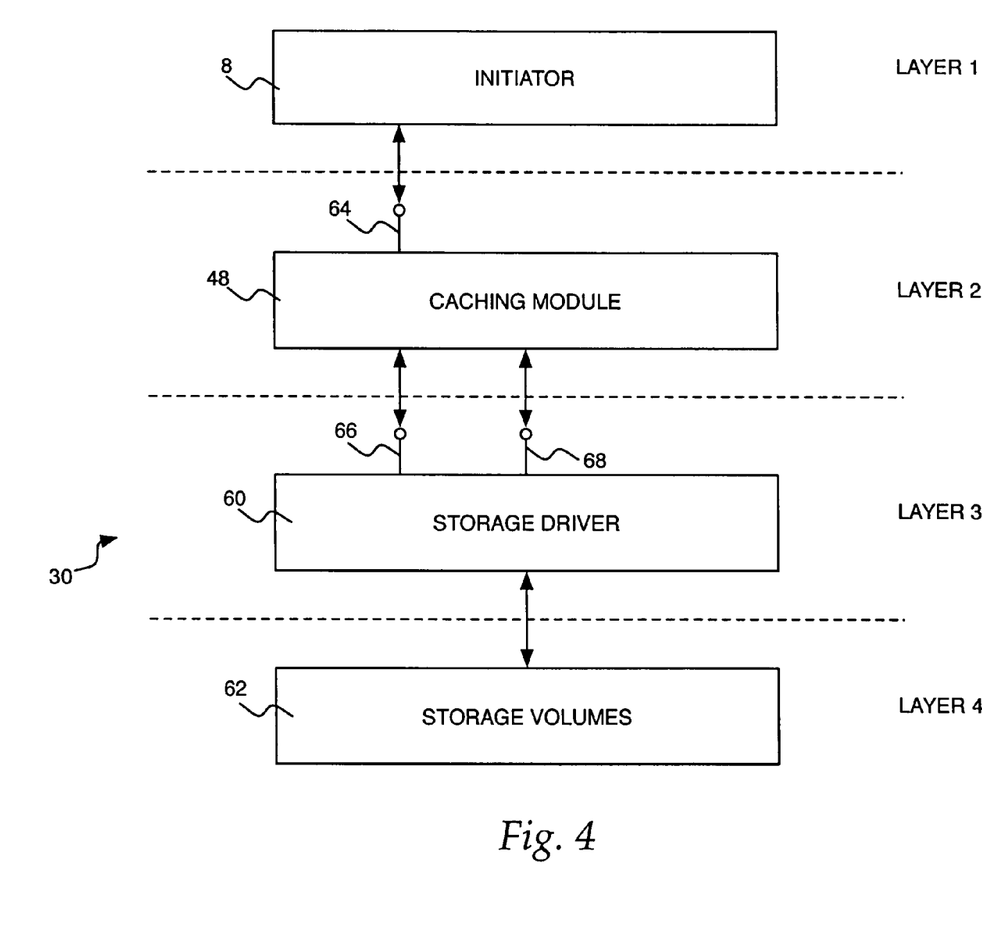
FIG. 4 is a block diagram illustrating additional aspects of a storage stack provided according to one embodiment of the invention.

Referring now to FIG. 4, additional details regarding aspects of the storage stack 30 will be provided. In particular, the aspects of the storage stack 30 shown in FIG. 4 are configured for integrating a caching module 48 that is operative to provide advance notice of I/O requests to a storage driver 60. With information in hand regarding future I/O operations, the storage driver 60 can determine whether the I/O request can be satisfied and, if so, can allocate space for the future I/O requests and organize the allocated space to store the data in the most efficient manner. These operations are performed by the storage driver 60 before the actual I/O request has been received from the caching module 48. If the storage driver 60 determines that it will be unable to satisfy the future I/O request, it can provide a notification to the caching module 48. In turn, the caching module 48 can notify the initiator 8 that made the request so that action may be taken by the initiator to avoid data loss.

In order to provide this functionality, the caching module 48 exposes an interface 64 to the initiator 8 through which the initiator 8 can make I/O requests, such as read and write requests. The storage driver 60 exposes two different interfaces to the caching module 48. The first interface 66 is utilized by the caching module 48 to notify the storage driver 60 that an I/O request has been received at the caching module 48 that will be forwarded to the storage driver 60 at a future point in time. The interface 66 may also be utilized by the storage driver 60 to provide a response to the caching module 48 indicating that the storage driver 60 will be unable to complete the requested I/O operation. In turn, the caching module 48 may utilize the interface 64 to inform the initiator 8 that the I/O request will not be completed.

The second interface 68 provided by the storage driver 60 is utilized by the caching module 48 to provide the actual I/O requests to the storage driver 60. I/O requests receive at the interface 68 are processed by the storage driver 60 in a normal fashion. In particular, read requests may be satisfied from the cache, where possible, and write requests may be cached until flushed to the storage volumes 62. It should be appreciated that while two interfaces 66 and 68 are shown in FIG. 4 and described herein, fewer or more interfaces may be utilized and other mechanisms for enabling the communication described herein between the caching module 48 and the storage driver 60 may be utilized without departing from the spirit and scope of the invention.

Figure 5:
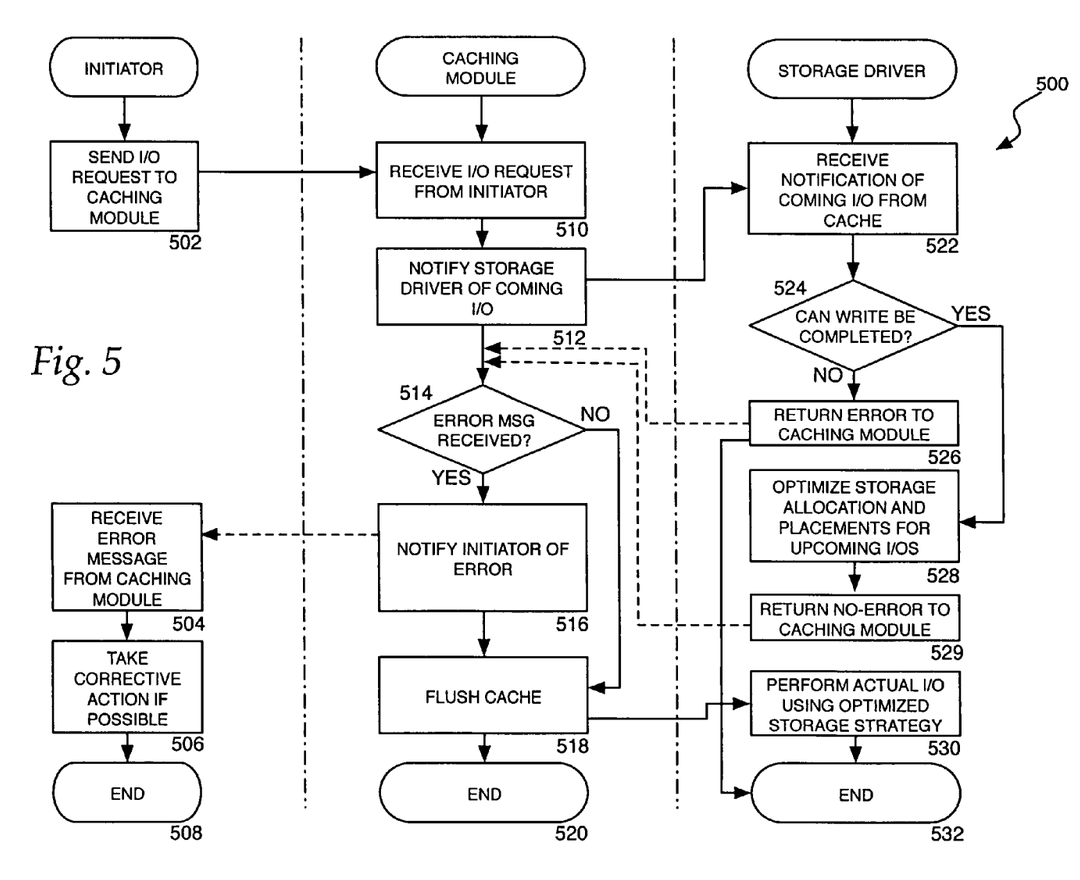
FIG. 5 is a flow diagram showing an illustrative routine for integrating a caching module into a storage system architecture according to one embodiment of the invention.

Referring now to FIG. 5, additional details regarding the operation of the computer 2 for integrating a caching module 48 will be provided. In particular, a routine 500 will be described illustrating operations performed by the computer 2 for enabling the caching module 48 to communicate advance data regarding I/O operations to the storage driver 60. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of F*igure* 500, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 500 begins at operation 502, where an initiator 8 sends a request to the caching module 48 to perform an I/O operation. At operation 510, the caching module 48 receives the I/O request from the initiator 8. The routine 500 then continues to operation 512, where the caching module 48 utilizes the interface 66 to notify the storage driver that an I/O request will be sent to the storage driver in the future. The notification to the storage driver takes the same form as an actual I/O request. However, since the request is made on the interface 66, the storage driver 60 interprets the request only as a notification that an I/O request will be forthcoming. The notification includes all of the parameters necessary for the storage driver 60 to perform the actual request, such as the size of the data, the logical block address of the I/O request, and the nature of the I/O request (read or write).

At operation 522, the storage driver receives the notification of the coming I/O request from the caching module 48. In response, the routine 500 continues to operation 522, where the storage driver 60 determines whether it will be able to complete the requested I/O operation. In particular, in a thin-provisioned system, the storage driver 60 is operative to determine whether sufficient space will be available on the storage volumes 62 for storing the data of the I/O request.

If, at operation 524, the storage driver 60 determines that it will be unable to satisfy the I/O request, the routine 500 continues to operation 526 where the storage driver 60 returns an error message to the caching module 48. At operation 514, the caching module 48 determines whether an error message has been received from the storage driver 60. If so, the routine 500 continues from operation 514 to operation 516, where the caching module 48 notifies the initiator 8 of the error. In turn, at operation 504, the initiator 8 receives the error message from the caching module 48. In response thereto, the initiator 8 may take corrective action at operation 506 to ensure that no data is lost as a result of the storage driver's inability to perform the requested I/O operation.

If, at operation 524, the storage driver 60 determines that it will be able to satisfy the I/O request, the routine 500 branches to operation 528 where the storage driver 60 optimizes the allocation and placement of the data for the upcoming I/O operation. For instance, according to one embodiment, the storage driver 60 may allocate space for the future I/O on the storage volumes 62 in a manner that ensures that the data for the I/O will not span two RAID stripes. According to another embodiment, the storage driver 60 may sequentialize random writes. In particular, the storage driver 60 may sequentialize writes of metadata and its associated data. From operation 528, the routine 500 continues to operation 529, where a "no-error" message is returned to the caching module 48. From operation 529, the routine 500 returns to operation 514, described above.

Other types of performance boosting optimizations may be performed by the storage driver 60 prior to receiving the actual I/O request by analyzing patterns in the addresses of data that is notified through the interface 66. For example, data patterns such as multiple streams of sequential writes or reverse writes may be detected within a sufficient time window due to the interface 66, and the actual I/Os may then be reoriented during their arrival to the storage driver 60 subsequently.

Periodically, the caching module 48 will flush its cache. This occurs at operation 518. When the cache is flushed, the caching module 48 makes a request to the storage driver 60 on the interface 68 to perform the actual I/O operations that the storage driver 60 has been previously notified of. In response, at operation 530, the storage driver 60 performs the actual I/O request utilizing the previously allocated and optimized storage. Because space has been previously allocated for the I/O operation and, potentially, the organization of the data to be stored has been optimized, the storage driver 60 can more quickly perform the requested I/O than if it had not had advance notification of the I/O operation. At operations 508, 520, and 532, the routine 500 ends.

In addition to returning an error-code to the caching module 48 through the interface 66, the storage driver 60 may also return other useful data that the caching module may use to improve performance or usability. This can include information about the time of last access on the address to which an I/O is occurring, or information about the physical location that the logical address is being mapped to. The caching module may be able to reorder its flush cycles in order to take advantage of this information.

It will be appreciated that embodiments of the present invention provide a method, apparatus, system, and computer-readable medium for integrating a caching module with a data storage system architecture. Although the invention has been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for integrating a caching module into a storage system architecture, the method comprising:
   receiving an I/O request from an initiator at the caching module to perform a write operation on behalf of the initiator;
   in response to receiving the I/O request at the caching module, forwarding the I/O request from the caching module to a first interface of two interfaces of a storage driver indicating that the write operation will be delivered to the storage driver in the future;
   in response to receiving the I/O request at the first interface of the storage driver, determining whether the write operation can be satisfied;
   in response to determining that the write operation cannot be satisfied, returning an error to the caching module indicating that the write operation cannot be satisfied; and
   upon receiving the error at the caching module, returning the error to the initiator indicating that the write operation cannot be satisfied.

2. The method of claim 1, further comprising allocating storage space for the write operation in response to determining that the write operation can be satisfied.

3. The method of claim 2, further comprising organizing the allocated storage space for the write operation so that the storage space does not cross two redundant array of inexpensive disk stripes.

4. The method of claim 3, further comprising optimizing the placement for the write operation in response to determining that the write operation can be satisfied.

5. The method of claim 4, further comprising:
   subsequently receiving at a second interface of the storage driver an I/O request from the caching module to perform the actual write operation; and
   in response to receiving the I/O request at the second interface of the storage driver, performing the write operation using the previously allocated space and optimized placement for the write operation.

6. A system for integrating a caching module into a data storage system, the system comprising:
   a processing unit;
   a caching module for execution on the processing unit and configured to receive write requests from one or more initiators and to forward the write requests to a first interface of two interfaces of a storage driver prior to delivering the write request to a second interface of the storage driver;
   a cache memory associated with the caching module; and
   the storage driver having two interfaces, the first interface configured to receive the write request from the caching module, to determine whether the write request can be successfully completed, and to return an error to the caching module in response to determining that the write request cannot be successfully completed, wherein the caching module is further configured to, upon receiving the error at the caching module, return the error to the initiator indicating that the write request cannot be successfully completed.

7. The system of claim 6, wherein the storage driver is further operative to allocate storage space for the write request in response to determining that the write request can be successfully completed.

8. The system of claim 7, wherein the storage driver is further operative to optimize the placement for the write request in response to determining that the write request can be successfully completed.

9. The system of claim 8, wherein optimizing the placement for the write request comprises allocating space so that the write request does not span two redundant array of inexpensive disk stripes.

10. The system of claim 9, wherein optimizing the placement for the write request comprises sequentializing metadata and data for the input/output request.

11. The system of claim 8, wherein the caching module is further configured to subsequently transmit to a second interface of the storage driver a request to perform the actual write operation defined in the write request, and wherein the storage driver is further configured to perform the write operation using the previously allocated space and optimized placement for the write request in response to receiving the request to perform the actual write operation from the caching module.

12. A computer storage medium having computer-executable instructions stored thereon that, when executed by a computer system, cause the computer system to:
   expose a first interface at a storage driver, the first interface configured to receive a write request from a caching module, determine whether the write request can be satisfied, and, in response to determining that the write request cannot be satisfied, return an error message to the caching module; and
   expose a second interface at the storage driver, the second interface configured to receive the write request from the caching module and to perform the write operation defined by the write request.

13. The computer storage medium of claim 12, further comprising causing the computer system to perform storage allocation and optimization for the write request received at the first interface prior to receiving the write request at the second interface in response to determining that the write request can be satisfied.

* * * * *